May 12, 1959 F. C. GRACE 2,886,636

TELEVISION CONTROL SYSTEM

Filed May 23, 1956 4 Sheets-Sheet 1

INVENTOR:
F. Cecil Grace
by Stewart F. Moore
ATTORNEY

INVENTOR.
F. Cecil Grace
by Stewart F. Moore
ATTORNEY

INVENTOR.
F. CECIL GRACE
BY Stewart F. Moore
ATTORNEY

INVENTOR.
F. CECIL GRACE
BY
Stuart F. Moore
ATTORNEY

United States Patent Office 2,886,636
Patented May 12, 1959

2,886,636

TELEVISION CONTROL SYSTEM

Francis Cecil Grace, Clifton, N.J.

Application May 23, 1956, Serial No. 586,873

15 Claims. (Cl. 178—7.2)

The present invention relates to television picture transmission systems and more particularly to a system for switching and mixing video signals derived from two or more sources. In more particularity, the present invention relates to a system for inserting or superimposing the image of a person, object or scene located in a studio onto an image derived from a pictorial representation of background material without visibly disclosing the detached and separate sources of the two images.

One system for generating video signals utilizes a light-tight studio in which the live or foreground scene performance is scanned with a traveling beam of light from a flying spot scanner which describes a conventional raster pattern upon the scene being televised. Reflected light from the flying spot is detected by photocells whose output signals are then processed and fed to a video transmitter. Lighting for the performers is provided by pulsed lighting systems which are energized during the re-trace or blanking interval of the flying spot scanner beam. Such a system is particularly adaptable for color programming since color discrimination can be achieved by utilizing suitable light filters selectively applied to the photocell pickups.

Heretofore, in such programming systems the insertion of background material taken from another source, such as slides or motion picture films, has been difficult and generally unsatisfactory. One system for background insertion utilizes a black backdrop in the live studio. The performers are required to wear light clothing and use very light make-up. A switch is provided to switch to the background "still" pictorial scene when the flying spot travels from the light performer to the black backdrop. However, the border area between the edge of the performer and the backdrop is not always so clearly defined that there is an abrupt change between black and lighter material. Therefore, the reflections of light into the black background often causes the insertion of the background to be faulty. Furthermore, where there is not sufficient contrast between the performer and the background, such as areas of gray color, the background is incorrectly switched, so that portions of the performer's features are not transmitted.

It is, therefore, an object of the present invention to provide a system for the keyed insertion of a video signal from a first source into signals from a second source without the apparent visual superposition of one upon the other.

It is another object of the present invention to provide a system for inserting a background video signal into a foreground signal wherein the delineation between the foreground and background is positive and is not dependent upon reflected light for keying associated inserting devices.

Briefly described, in accordance with the present invention, background insertion effects are produced by means of the flying spot technique, the flying spot being produced by a cathode ray tube and associated lenses which scan a "foreground" performance in a light-tight studio. A collecting lens having the dimensions of the scanning raster is positioned behind the foreground performers. Photocells and associated processing equipment are situated in front of the performers and behind the collecting lens. When light from the flying spot scanner is not impinging on the foreground scene, it is caused to be passed through the collecting lens and focused upon at least one photocell pickup. This latter photocell is adapted to actuate signal selector means for switching the studio output to signals originating from a background picture generator. When light from the flying spot strikes the performers in the foreground scene, it is reflected to the foreground photocell pickups. These pickups and associated processing equipment are connected to the signal selector means and therefore cause it to switch from background to foreground signal, which in turn is fed to the video transmitter.

It is, therefore, another object of the invention to provide an improved keyed insertion system for the transmission of television programs incorporating the features enumerated above.

For a better understanding of the invention, together with other and further objects thereof, reference is made to the following detailed description taken in connection with the accompanying drawings, in which.

Figure 1:
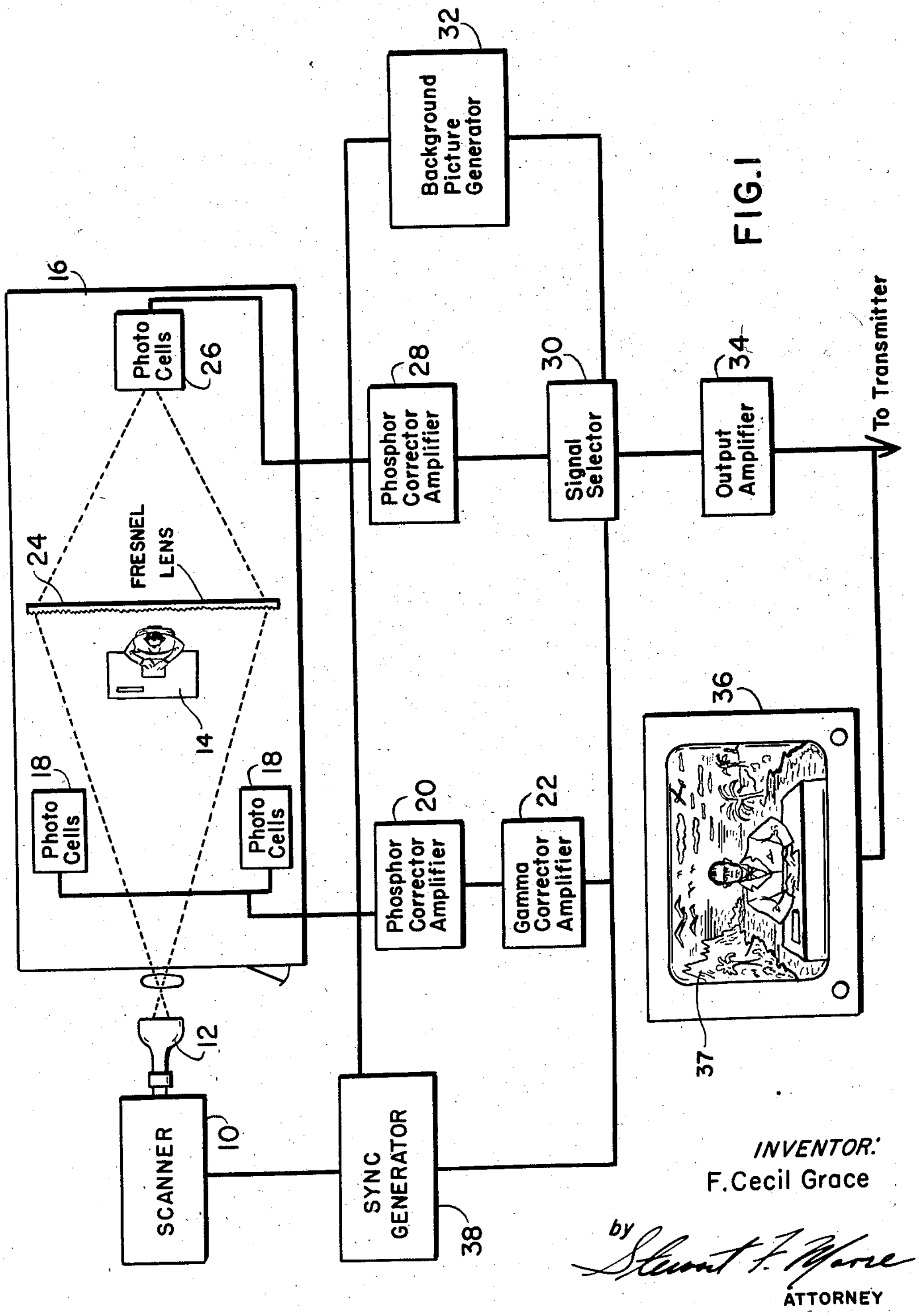
Fig. 1 is a block diagram of an embodiment of the present invention.

Referring now to the drawings, a conventional flying spot scanner 10 has an associated cathode ray tube 12 with suitable projecting lenses. Scanner 10 has the usual horizontal and vertical scanning amplifiers which cause a raster to be described upon the face of the cathode ray tube 12 at conventional scanning rates. Light from the spot which forms the raster is focused by the projecting lens 13 upon the performers and associated studio scenery equipment comprising a scene to be televised generally indicated at 14. An example of a suitable flying spot scanner which may be employed in the present invention is set forth in "The Flying Spot Scanner" by F. A. J. vander Poel and J. J. P. Valeton, Phillips Technical Review, volume 15, No. 89, February–March 1954, pages 221–232.

The performers 14 are situated in a light-tight studio 16. When light from the flying spot impinges upon the performers it is reflected back towards the scanner 10 and is gathered by photocells 18 where it is translated into an electrical signal representative of the intensity of the reflected light and fed as video information to a phosphor corrector amplifier 20. Such amplifiers are generally used to compensate for the exponential decay in the wave form received from the photocells due to the fact that the persistence of the phosphor in the cathode ray tube 12 of the flying spot scanner system 10 cannot be made as short as would be desired. Thus when the flying spot moves from a light area to a black area with a sharp transition between areas, the output of the photocell does not immediately change to a value corresponding to black since the after-glow of that part of the scanner phosphor that the electron beam has left is still focused on a light area of the subject. Amplifiers 20 thus provide a complementary characteristic to the exponential decay signal provided by photocells 18 during the transition from light to black.

The output of the phosphor corrector amplifier 20 is fed to a conventional gamma corrector amplifier 22 which compensates for the fact that the curve of signal voltage versus light output of the picture tubes used in conventional television receivers is not linear. Amplifiers of the type 20, 22 are commonly used in television studio transmitting equipment and may also compensate for other non-linearities in the system.

It is understood that any number of foreground photocells 18 may be used if desired and may be placed in a number of different positions in order to most effectively gather light from the scene to be televised. Furthermore, such a system is particularly adaptable to color inasmuch as by providing selected light filters for photocells 18, the color hues and light values of the foreground scene 14 may be detected and translated into video color signal information.

The flying spot studio scanning system as utilized for televising live performances both for monochrome and color, and one for which the present invention is particularly adapted is described in the article entitled "The Vita-Scan New Color TV Scanner," by C. E. Spicer, appearing in Teletech Magazine, February 1956.

Placed immediately behind the foreground scene 14 is a collecting lens 24 which may be of the Fresnel type and is adapted to focus the received light on a photocell 26. Lens 24 preferably has an area at least as large as the projected raster so that maximum background area may be inserted when desired. A translucent screen which is adapted to diffuse light passing therethrough onto one or more photocells 26 may serve for lens 24 if desired. When such a screen is used, photocells 26 may be positioned apart from each other so as to collect light passing through the screen from more than one angle. In such instances, it is desirable to enclose the area behind the screen and around the photocells to exclude reflected light.

A plurality of photocells 26 may be used if desired, and are preferably of the same type as photocells 18, namely a conventional multiplier type photoelectric cell having a large photocathode and a plurality of dynodes. As photocell 26 is disposed to the rear of foreground scene 14, then only the light which passes freely through screen 24 will be received by photocells 26. Thus the flying spot is interrupted during its horizontal scan as it traces out the raster upon screen 24 by the presence of objects in the foreground. In such instances, the light is reflected forwardly to photocells 18 instead of passing unimpeded rearwardly to photocells 26. In this manner a definite and positive distinction between foreground and background areas is obtained for each raster line traced out by the scanner tube 12.

Photocell 26 and screen 24 are also disposed in the light-tight studio 16. The outputs of photocells 26 are fed to a phosphor corrector amplifier 28 similar to amplifier 20 and the output of amplifier 28 is in turn fed to a signal selector 30 described hereinafter in more detail.

The background picture generator 32 may be a conventional slide scanner which is adapted to scan a slide view of a scene and translate the scene into video screen information, or it may be a motion picture film camera with associated kinescope devices as is well known in the art. Generator 32 provides a selected background picture to fill in the areas in the televised scene not occupied by the foreground performers or studio props. Thus it is desirable that output from the background generator be switched into the composite program signal during those periods when the flying spot, during the course of tracing a raster, is passed through screen 24 to photocells 26.

Switching of the outputs from amplifier 22 and generator 32 is provided by signal selector 30, which in general comprises a plurality of electronic switches which are adapted to switch the input of a studio signal output amplifier 34 from connections with the output of the foreground amplifier 22, to the output of the picture generator 32 in response to a signal generated by photocells 26 and amplified by phosphor corrector amplifiers 28. Conversely, when no signal is received from photocells 26 by signal selector 30, thereby indicating that the flying spot is traveling over some portion of the foreground scene, signal selector 30 then selects the signal outputs from the foreground photocells 18, associated amplifiers 20 and 22, and presents it to output amplifier 24 to be passed on to video transmitting equipment. As a result, a composite picture is obtained in a monitor television receiver 36 which adds both the foreground and a selected background 37 without any "transparency" effect, that is superposition of one picture upon the other without the effect of a separate source origin of the two pictures being apparent to the viewer.

A conventional sync generator 38 provides the usual synchronizing and blanking pulses, horizontal and vertical drive pulses for scanner 10, background picture generator 32 and signal selector 30. Thus the operation of all these devices is synchronized one with the other so as to function in proper relationship. When it is desirable to insert background material in only a portion of the composite picture or where the foreground scene is very near the camera, so that the arc described by the scanning beam is small, a relatively small sized collecting lens 24 may be used, with a resultant saving in equipment costs. For example, it has been found that for close up foreground pictures, a suitable lens 24 and photocell 26 may be mounted in a container having substantially the size of a standard television receiver cabinet.

Figure 2:
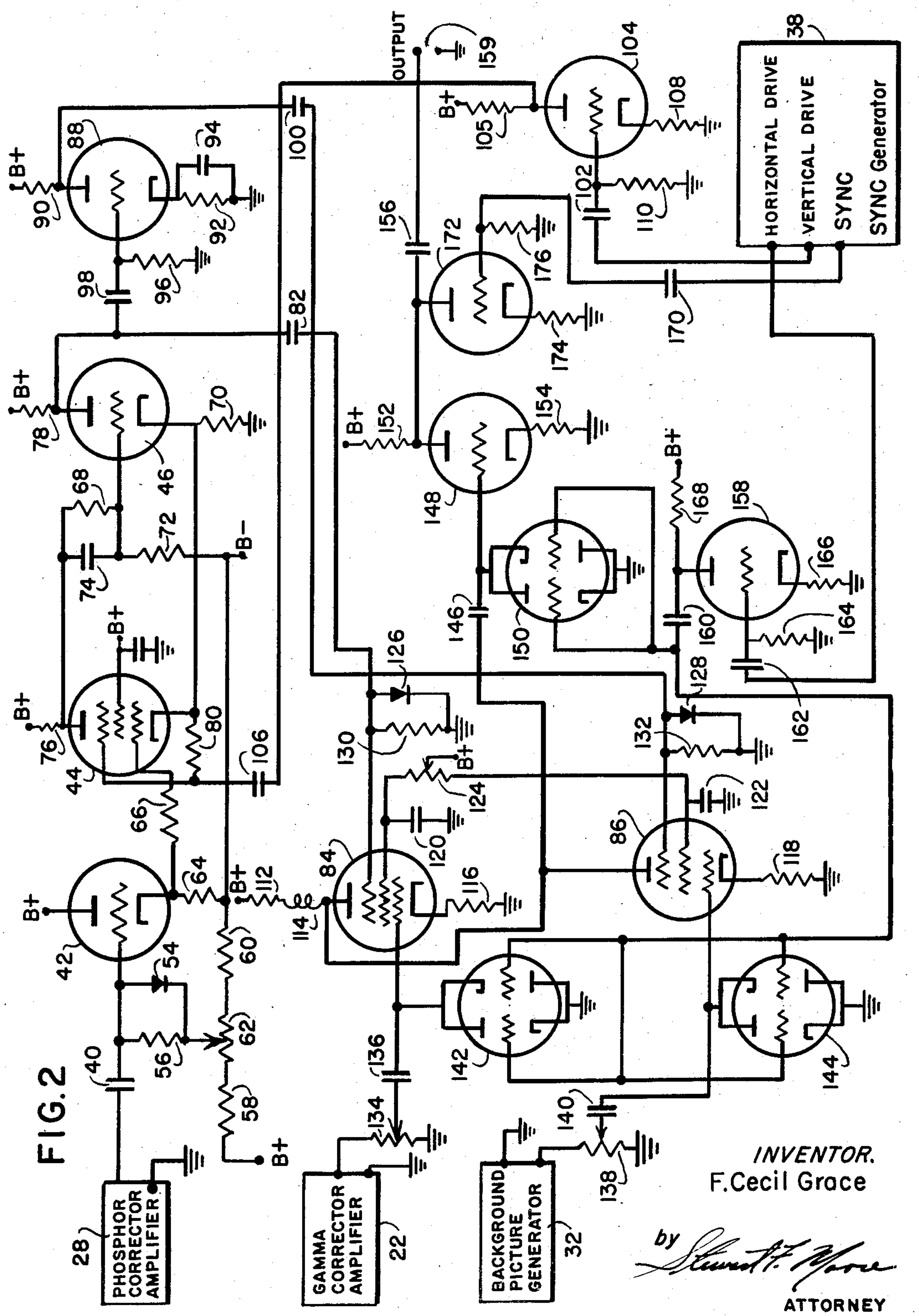
Fig. 2 is a schematic diagram of the electronic signal selector of the present invention.

In Fig. 2 the circuitry of signal selector 30 is shown in detail. The output of phosphor corrector amplifier 28 is fed through a coupling capacitor 40 to the grid of an amplifier 42 which is connected as a cathode follower circuit to provide a low impedance input for a trigger type circuit comprising electron tubes 44 and 46. Diode 54 and associated resistor 56 are connected in the grid-cathode circuit of tube 42 and function as a conventional restorer for cathode follower tube 42 to restore the D.C. reference level of the video signal lost through the use of A.C. coupling capacitors. Voltage divider resistors 58, 60 and adjustable resistor 62 provide a voltage for setting the D.C. restoring level of diode 54. Tube 42 has a cathode bias resistor 64 to provide for operation of the tube over a linear portion of its characteristic curves, and is directly coupled by resistor 66 to the input grid of tube 44. Tubes 44 and 46 comprise a conventional Schmidt trigger circuit of the type described in the book Time Bases by O. S. Puckle, page 57. However, other suitable trigger circuits may be used if desired. Thus the anode of tube 44 is directly coupled to the grid of tube 46 through a resistor 68, and both tubes have a common cathode resistor 70. Bias voltage is applied to the grid of tube 46 through voltage dividing resistors 68 and 72.

A coupling capacitor 74 is also provided between the anode of tube 44 and the grid of tube 46. Tubes 44 and 46 have plate load resistors 76, 78 respectively, and the suppresser grid of tube 44 is returned to the cathode of this tube through a resistor 80.

The Schmidt type electronic trigger circuit is adapted to switch positively from one tube to the other. That is, either tube 44 or 46 will conduct depending upon whether an input signal to tube 44 exists, but the circuit never attempts to establish an output state wherein each tube is partially conductive.

Thus the circuit effectively prevents the transmission of both a background and foreground picture simultaneously, which might otherwise occur due to weak signals caused by stray reflection of light into the control photocell 26 or in some situations by insufficient diffusion when reltaively opaque translucent screen is used.

The output of the trigger circuit is fed through a coupling capacitor 82 to a grid of tube 84 which, in conjunction with tube 86 and associated electronic circuitry, function as an electronic switch. So that a true flip-flop action for switch tubes 84, 86 may be provided, in order that when one tube is rendered conductive the other will be rendered non-conductive, a phase inverter circuit for inverting the phase of the output of the trigger circuit is provided comprising tube 88 with associated anode load resistor 90 and a cathode bias resistor 92 with associated by-pass condenser 94 and a grid to ground resistor 96. Thus the output from the trigger circuit is coupled through a coupling capacitor 98 to a phase inverter tube 88 which inverts the phase of the signal passed by capacitor 98 and applies the inverted output signal through a coupling capacitor 100 to an input grid of tube 86.

Tubes 84, 86 have their anodes connected in parallel and are in turn connected to B+ through an anode load resistor 112 and radio frequency choke 114. Each tube has a cathode to ground resistor 116, 118 respectively, and the usual screen grid circuitry is provided which comprises screen to ground capacitors 120, 122 and a variable adjusting resistor 124 for balancing the screen voltage between the two tubes 84, 86. D.C. restoration for each switch tube is provided by means of diodes 126, 128 respectively with their associated grid-to-ground resistors 130, 132.

The output of gamma corrector amplifier 22 is impressed across variable resistance type gain control 134 and fed through a coupling capacitor 136 to the control grid of switch tube 84. The output of background picture generator 32 is likewise impressed across a variable resistance type gain control 138 and fed through a coupling capacitor 140 to the control grid of switch tube 86. Dual triode tubes 142, 144 are connected respectively between the control grids of tubes 84, 86 and ground, and function as clamp tubes to provide blanking by preventing the passing of a signal to the control grids of tubes 84, 86 during the horizontal retracing intervals. Thus a horizontal drive pulse provided by sync generator 38 is amplified by amplifier tube 158 and is fed through a coupling capacitor 160 to the grids of dual triodes 142, 144.

The anodes of switch tubes 84, 86 are connected in parallel and the output of these tubes is fed through a coupling capacitor 146 to an amplifier 148 which has a plate load resistor 152 and a cathode to ground resistor 154. A dual triode 150 similar to dual triodes 142, 144 is connected as a clamp tube between the control grid of amplifier 148 and ground, and is similarly biased by horizontal drive amplifier 158 to clamp the control grid of amplifier 148 to ground during the horizontal re-trace periods.

Horizontal drive amplifier 158 has a coupling capacitor 160 for feeding the horizontal drive voltage to dual triodes 142, 144 and 150, respectively, and an input coupling capacitor 162 for coupling the control grid of amplifier 158 to a source of negative horizontal drive voltage provided by sync generator 38. Amplifier tube 158 also has a conventional grid to ground resistor 164 and cathode bias resistor 166, and a plate load resistor 168. The output of amplifier tube 148 is connected through a coupling capacitor 156 to output terminals 159. Negative sync pulses are fed in the usual manner from sync generator 38 through capacitor 170 to an amplifier tube 172 which in turn is connected to the output of amplifier 148. Amplifier tube 172 has a cathode bias resistor 174 and a grid to ground resistor 176. Thus it will be seen that synchronizing pulses are amplified by tube 172 and added to the output signal which is then ready for transmisison to a television transmitter. Of course, it is understood that if synchronizing pulses are added by subsequent video equipment, amplifier 172 may be omitted. A conventional power supply having suitable output voltages may be used to supply the necessary B+ and B— bias voltages for the signal selector circuits.

For the purpose of understanding the operation of signal selector 30, consider for example that light from the scanner 10 is passing through lens 24 and is received by photocells 26, amplified by phosphor corrector amplifier

28 and fed to amplifier tube 42. Due to the clamping action of diode 54, amplifier 42 will amplify only the negative going pulses received by its control grid. When these negtaive signals are received by amplifier 42, they bias the grid of tube 44 of the Schmidt circuit sufficiently to cause a decrease in conduction therein. Because of the action of the circuit, tube 44 rapidly approaches a non-conducting state and conversely causes tube 46 to conduct.

Tube 84 receives the negative going pulse from tube 46 which causes it to cease to conduct because the pulse is fed to a control electrode of tube 84, while the same pulse is inverted by tube 88 and is applied as a positive going pulse to a control electrode of electronic switch tube 86 which thereupon conducts. The switch is therefore flipped in a direction so as to allow the background picture generator to feed a signal to tube 148 where it is again amplified and appears as an output across output terminals 159.

It is desirable with an electronic switching system of the type herein described to be able to pass the output of the trigger circuit through A.C. coupling capacitors to electronic switch tubes 84, 86. Yet it is desirable that the apparatus be able to distinguish between two possible extreme conditions which may occur wherein the input signal to the trigger circuit has the character of D.C., that is, a constant input signal or a constant lack of input signal. These conditions occur when there are no foreground objects and screen 24 is everywhere illuminated, or when foreground objects completely obscure the screen so that only a foreground picture is presented.

In the first instance, photocell 26 receives a constant light input, so that its output is a constant D.C. During the course of the scanning operation, as soon as the various coupling capacitors assume D.C. steady state charges, the associated amplifiers 28 act as though no signal were being presented. In the second instant, when the scene is all foreground, photocell 26 is dark so that the amplifier 28 again transmits no signal.

To prevent switch tubes 84, 86 from assuming a condition wherein both tubes are conducting, a state eventually reached when there is no A.C. output from trigger tube 46, both horizontal and vertical retrace blanking signals are employed. During normal blanking operations, that is when the flying spot is on a re-trace cycle preparatory to initiating the scanning of another line, the spot is blanked out so that no picture is presented and it accordingly does not matter during that interval which way the electronic switch or signal selector 30 is thrown.

Inasmuch as light during the horizontal blanking interval is absent, photocell 26 is never illuminated during this period. Thus, no signal is fed at that time from the cathode follower stage to tube 44 of the Schmidt trigger circuit. The tube is then rendered conductive because of the positive bias of tubes 42, 44, and will maintain that state, except when cathode follower tube 42 receives a negative signal. Tube 46 is rendered correspondingly non-conductive, and due to the arrangement of electronic switch connections between tubes 84, 86, and amplifier 22, whenever tube 46 is rendered non-conductive, a foreground picture will always be shown. Therefore, during horizontal blanking the Schmidt trigger circuit always causes the electronic switch to go to the foreground picture position.

Then, if the aforementioned condition were present where there are no foreground objects and screen 24 is everywhere illuminated, the trigger circuit during the horizontal blanking period would reset the switch tubes 84, 86 once each scanning line to the opposite condition. The coupling capacitors would then recharge in the background picture direction during the next horizontal scan so that the net result is maintenance of the switch tubes 84, 86 in the background picture condition.

On the other hand, during vertical blanking a negative signal from a vertical drive amplifier of sync generator 38 is presented to the suppresser grid of tube 44 through a coupling capacitor 106 connected to vertical drive amplifier 104, so that tube 44 is cut off. Amplifier tube 104 is connected to sync generator 38 through a coupling capacitor 102, and has a grid to ground resistor 110, a cathode bias resistor 108 and plate load resistor 105.

Thus, during vertical blanking tube 44 is always rendered non-conductive and due to the inherent action of the Schmidt trigger circuit tube 46 is always rendered conductive. Because of the nature of the connections to electronic switch tubes 84, 86, a background picture is always shown when tube 46 conducts. Then if a condition were present where there were no background objects and no light passed through screen 24, the trigger circuit upon receiving the vertical re-trace drive pulse would reset the switch tubes 84, 86 once each field change during vertical re-trace to the opposite condition. The various coupling capacitors would then re-charge in the foregoing picture direction during the next frame so that the net result is maintenance of switch tubes 84, 86 in the foreground picture condition.

Figure 3:
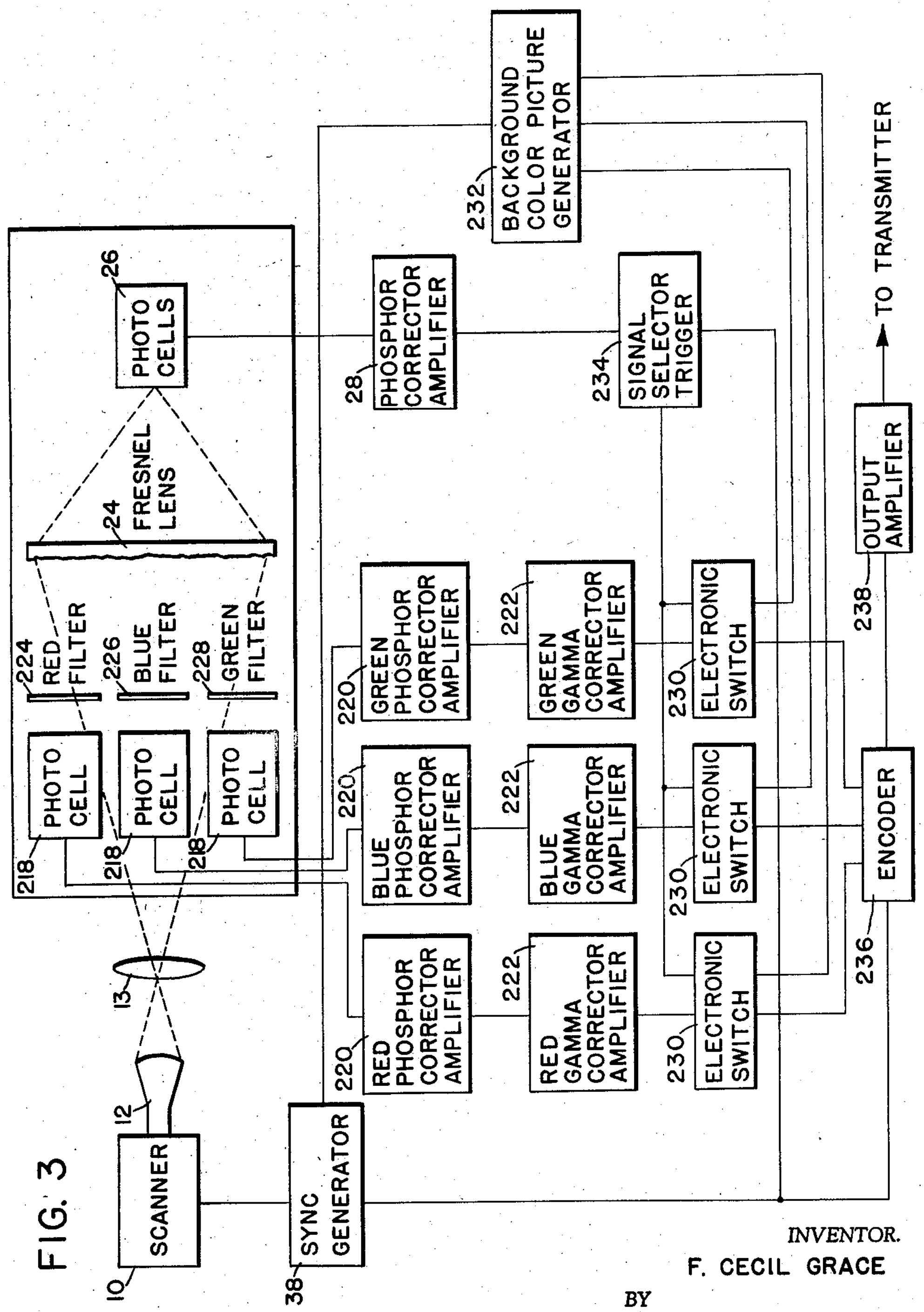
Fig. 3 is a block diagram of a modification of the present invention to use in a color television system.

It will be understood by one skilled in the art that the invention is not limited to monochrome television, but may be used in a color television system. Where color is used in the flying spot scanner system (Figs. 3 and 4), three sets of pick-up tubes 218, three phosphor corrector amplifiers 220 and three gamma corrector amplifiers 222, similar to photocells 18 and amplifiers 20 and 22, are generally provided, one set for each of the primary colors, red, blue and green. Color differentiation is made by providing photocells 218 with selected red, green and blue filters 224, 226, 228, so that each photocell 218 generates a signal whose amplitude is representative of both the brightness of the scene and the chrominance, that is, the hue and saturation of the color. The output of each primary color gamma corrector amplifier 222 is then fed to an associated electronic switch 230 (Fig. 3) which is adapted to switch background picture information from a conventional color picture generator 232 similar to picture generator 32, but supplying the proper color to correspond with the color signal information fed by amplifier 222. A switch 232 is provided for each of the three colors, but in each instance the switches would be fed by a single trigger circuit 234, such as Schmidt trigger circuit 44, 46 inasmuch as photocell 26 is either a monochrome or a color system is required only to detect the presence or absence of light. Outputs from all three electronic switches would then go to a conventional color television system encoder 236, which may be similar to the type described on page 329 of Color Television Engineering, by John W. Wentworth, published by McGraw-Hill, 1955. The output of the encoder is fed into a conventional studio output amplifier 238. Sync generator 38 is connected in the same manner as described heretofore in connection with a monochrome system, to background generator 232, to trigger and switch circuits 230 and 234 respectively and to encoder 236 to provide the required conventional synchronizing pulses.

Figure 4:
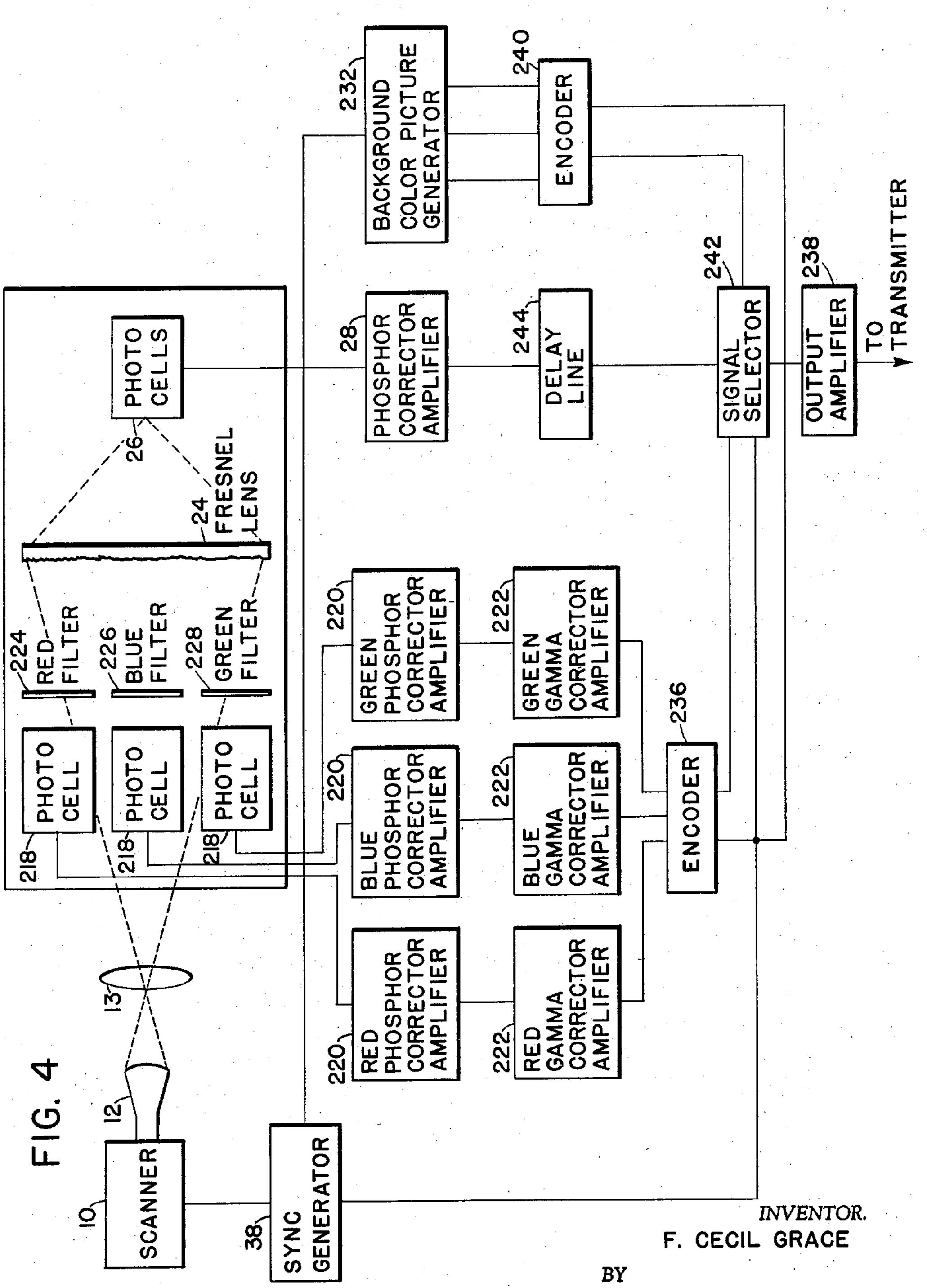
Fig. 4 is a modification of the embodiment of the invention shown in Fig. 3.

On the other hand, if it is desired, the outputs from the three sets of photocells 218 provided for each color may be fed first to an encoder 236 while color signals from a background picture generator 232, similar to picture generator 32, are fed to a second encoder 240, as shown in Fig. 4. The output of each encoder 232, 240 would in turn be fed to a signal selector 242 similar to selector 30. In such a system, it is preferable to interpose a conventional delay line 244 at a suitable position in the channel between the photocells 26 and the signal selector 242 to compensate for the inherent delays encountered when an encoder is used in a color television system. As in the modification shown in Fig. 3, sync generator 38 is connected to background picture generator 232, to signal selector 242, and to encoders 236 and 240 to provide the required conventional synchronizing pulses.

Although a preferred embodiment of a novel background insertion system has been described as utilizing photocell light pickups, yet it is understood by one skilled in the art that other video camera apparatus, such as an image-orthicon type camera may be used if desired. Furthermore, it is understood that while a preferred embodiment of the present invention is shown as having electron tubes, yet it will be appreciated that such valves are shown for purposes of illustration and that other electronic valves, such as transistors, may be used if desired.

While the present invention has been disclosed by means of specific illustrative embodiments thereof, it would be obvious to those skilled in the art that various changes and modifications in the means of operation described or in the apparatus may be made without departing from the spirit of the invention as defined in the appended claims.

I claim:

1. A background insertion system for a television transmitting system comprising means presenting a foreground scene to be scanned, means for scanning said scene with a traveling beam of light, first means responsive to variations in the intensity of said light for translating light reflected from said foreground scene into an electrical signal, light gathering means disposed behind said scene, second light responsive means for translating light gathered by said light gathering means into an electrical signal, a background picture generator for generating a video signal representative of a selected background scene, switch means connected to said first light translating means and said background picture generator and responsive to signals from said second light translating means for selecting said background picture generator signal for presentation to a video transmitting system whenever light is received by said light gathering means.

2. A system for inserting signals representative of background scenes into a flying spot video transmitting system which comprises a generator of video signals representative of a background scene, and means responsive to unreflected light from a flying spot scanner for selecting signals from said background generator for presentation to a transmitting system whenever light passes unimpeded by a foreground scene to said light responsive means.

3. A background insertion system for a television transmitting system comprising a flying spot scanner for generating a traveling beam of light, at least one photocell circuit for translating light received from said scanner into a video signal, a lense for focusing said light on said photocell circuit, means responsive to light reflected from a foreground scene for generating a signal representative of the foreground scene, a generator of signals representative of the background scene, and signal switching means connected to said photocell circuit for selecting a signal from said background signal generator for presentation to a video transmitting system whenever light from said scanner is focused on said photocell circuit, said signal switching means being adapted to connect said foreground picture generating means to a video transmitting system whenever a foreground scene is interposed between said scanner and said lens to cut off light from said scanner.

4. The system defined in claim 1 wherein said light gathering means includes a Fresnel lens for focusing said light on said second light responsive means.

5. The system defined in claim 1 wherein said light gathering means includes a translucent screen, and one side of said screen and said second light responsive means have means for excluding all reflected light therebetween.

6. A background insertion system for a television transmitting system comprising a first, second, and third source of video signals, means for scanning a scene with a beam of light, means for suppressing signals from said second source whenever said scanning light is reflected into said first source, means operative in response to light from said scanner directly striking said third source for suppressing signals from said first source, and means for combining the unsuppressed signals from said first and second sources.

7. A background insertion system for a television transmitting system comprising a first, second, and third source of video signals, means for scanning a scene with a traveling beam of light, means for suppressing signals from said second source whenever said scanning light is reflected into said first source, means operative in response to light from said scanner directly striking said third source for suppressing signals from said first source, means for combining the unsuppressed signals from said first and second sources, means for blanking said beam of light during each horizontal return trace of said scanner, and means for actuating said second named means in response to actuation of said blanking means.

8. A background insertion system for a television transmitting system comprising a first, second, and third source of video signals, means for scanning a scene with a traveling beam of light, means for suppressing signals from said second source whenever said scanning light is reflected into said first source, means operative in response to light from said scanner directly striking said third source for suppressing signals from said first source, means for combining the unsuppressed signals from said first and second sources, means for blanking said beam of light during each vertical return trace after a scene has been scanned, and means for actuating said third named means in response to actuation of said vertical blanking means.

9. The system defined in claim 6 wherein means are provided for synchronizing the operation of said second source of signals with said scanning means.

10. A background insertion system for a television transmitting system comprising means presenting a foreground scene to be scanned, means for scanning said scene with a traveling beam of light, first means responsive to variations in the intensity of said light for translating light reflected from said foreground scene into an electrical signal, light gathering means disposed behind said scene, second light responsive means for translating light gathered by said light gathering means into an electrical signal, a background picture generator for generating a video signal representative of a selected background scene, an electronic switch circuit having output terminals, said switch circuit being adapted to selectively connect said background picture generator or said foreground signal to said output terminals, a trigger circuit for operating said electronic switch, and means operative in response to signals from said second light responsive means for actuating said trigger circuit to cause said switch to connect said background picture generator to said output terminals.

11. A background insertion system for a television transmitting system comprising means presenting a foreground scene to be scanned, means for scanning said scene with a traveling beam of light, first means responsive to variations in the intensity of said light for translating light reflected from said foreground scene into an electrical signal, light gathering means disposed behind said scene, second light responsive means for translating light gathered by said light gathering means into an electrical signal, a background picture generator for generating a video signal representative of a selected background scene, an electronic switch circuit having output terminals, said switch being adapted to selectively connect said background picture generator or said foreground signal to said output terminals, a trigger circuit for operating said electronic switch, means operative in response to signals from said second light responsive means for actuating said trigger circuit to cause said switch to connect said background picture generator to said output terminals, and means for blanking said beam during a horizontal return trace interval of said scanner, said trigger circuit being adapted to cause said switch to connect said foreground signal to said video transmitting system each time said blanking means is actuated.

12. A background insertion system for a television transmitting system comprising means presenting a foreground scene to be scanned, means for scanning said scene with a traveling beam of light, first means responsive to variations in the intensity of said light for translating light reflected from said foreground scene into an electrical signal, light gathering means disposed behind said scene, second light responsive means for translating light gathered by said light gathering means into an electrical signal, a background picture generator for generating a video signal representative of a selected background scene, an electronic switch circuit having output terminals, said circuit being adapted to selectively connect said background picture generator or said foreground signal to said output terminals, a trigger circuit for operating said electronic switch, means for blanking said beam of light during each vertical return trace after a field has been scanned, and means operative in response to said vertical blanking means to actuate said trigger circuit to cause said switch to connect said background picture generator to said output terminals.

13. A background insertion system for a television transmitting system comprising means presenting a foreground scene to be scanned, means for scanning said scene with a traveling beam of light, first means responsive to variations in the intensity of said light for translating light reflected from said foreground scene into an electrical signal, light gathering means disposed rearwardly of said scene, second light responsive means for translating light gathered by said light gathering means into an electrical signal, a background picture generator for generating a video signal representative of a selected background scene, switch means having output terminals and adapted to switchably connect either said foreground or background scene signals to said output terminals, said switch means comprising a trigger circuit connected to said second light translating means and adapted to emit a pulse each time a signal is received from said second light translating means, a phase inverter connected to said trigger circuit for inverting the phase of said trigger pulse, a first electronic valve connected to said first light translating means, a second electronic valve connected to said background picture generator, connections from said trigger circuit to said first electronic valve, connections from said phase inverter to said second electronic valve, means for causing said first valve to conduct when light from said scanner is reflected by said foreground scene so that said signal from said first light translating means is passed to said output terminals, and means for causing said trigger circuit and said phase inverter to emit pulses having selected polarities so that said first valve ceases to conduct and said second valve conducts to pass said signal from said background picture generator to said output terminals each time said trigger circuit receives a signal from said second light translating means.

14. A background insertion system for a television transmitting system comprising means presenting a foreground scene to be scanned, means for scanning said scene with a traveling beam of light, a plurality of light translating means, each responsive to light reflected from said scene of a selected brightness and chrominance for translating said reflected light into electrical signals, a background signal generator for generating video signals representative of the brightness and chrominance of a selected background scene, light gathering means disposed rearwardly of said scene, second light responsive means for translating light gathered by said light gathering means into an electrical signal, a plurality of electronic switch circuits, each connected to one of said first named light translating means and said generator to switchably select foreground or background signals of like chrominance, a trigger circuit for actuating said electronic switches, a color encoder connected to the output of said switches, and means operative in response to signals from said second light responsive means for actuating said trigger circuit to cause said switches to pass said background picture generator signals to said encoder.

15. A background insertion system for a television transmitting system comprising means presenting a foreground scene to be scanned, means for scanning said scene with a traveling beam of light, a plurality of light translating means, each responsive to light reflected from said scene of a selected brightness and chrominance for translating said reflected light into electrical signals, a first color encoder connected to said light translating means for encoding said signals into a composite color video signal, a background signal generator for generating video signals representative of the brightness and chrominance of a selected background scene, a second color encoder connected to said background signal generator for encoding said background signals into a second composite color video signal, light gathering means disposed rearwardly of said scene, second light responsive means for translating light gathered by said light gathering means into an electrical signal, switch means having output terminals connected to said first and second encoder and responsive to signals from said second light translating means for switching said output terminals from said first encoder to said second encoder whenever light is received by said light gathering means.

References Cited in the file of this patent

UNITED STATES PATENTS 2,244,239 Blumlein ---------------- June 3, 1941

FOREIGN PATENTS 720,182 Great Britain ----------- Dec. 15, 1954